(12) United States Patent
Hald

(10) Patent No.: US 7,316,162 B2
(45) Date of Patent: Jan. 8, 2008

(54) METHOD OF DETERMINING THE SOUND PRESSURE RESULTING FROM A SURFACE ELEMENT OF A SOUND EMITTING DEVICE

(75) Inventor: Jorgen Hald, Birkerod (DK)

(73) Assignee: Bruel & Kjaer Sound & Vibration Measurement A/S, Naerum (DK)

( * ) Notice: Subject to any disclaimer, the term of this patent is extended or adjusted under 35 U.S.C. 154(b) by 0 days.

(21) Appl. No.: 10/576,559

(22) PCT Filed: Nov. 10, 2004

(86) PCT No.: PCT/DK2004/000778

§ 371 (c)(1),
(2), (4) Date: Apr. 20, 2006

(87) PCT Pub. No.: WO2005/043376

PCT Pub. Date: May 19, 2006

(65) Prior Publication Data

US 2007/0068255 A1    Mar. 29, 2007

(30) Foreign Application Priority Data

Nov. 10, 2003  (DK) ............................. 2003 01666

(51) Int. Cl.
*G01H 3/12* (2006.01)
(52) U.S. Cl. ............................................. 73/647
(58) Field of Classification Search .......... 73/645–648, 73/602, 594, 587; 367/121–125, 110–114, 367/153–155
See application file for complete search history.

(56) References Cited

U.S. PATENT DOCUMENTS

| 3,844,175 A | * | 10/1974 | Hixson ........................ 73/647 |
| 4,281,551 A | | 8/1981 | Gaudriot et al. |
| 4,712,429 A | * | 12/1987 | Raspet et al. ................. 73/646 |
| 6,760,449 B1 | * | 7/2004 | Matsuo ........................ 381/92 |
| 7,054,228 B1 | * | 5/2006 | Hickling ..................... 367/124 |
| 2002/0035456 A1 | | 3/2002 | Cremers et al. |

FOREIGN PATENT DOCUMENTS

| EP | 0 015 852 A1 | 9/1980 |
| JP | 54-139587 | 10/1979 |
| JP | 62-115326 | 5/1987 |

* cited by examiner

*Primary Examiner*—Helen Kwok
(74) *Attorney, Agent, or Firm*—Oliff & Berridge, PLC

(57) ABSTRACT

A three-dimensional array (10) of microphones (M) is used to determine the three-dimensional sound field above a surface element ($\Delta S$) of a sound emitting surface (S), and the air-particle velocity ($u_n$) at the surface element ($\Delta S$) is determined using Near-Field Acoustical Holography (NAH). A volume velocity sound source (11) is used to emit a volume velocity ($Q_v$) in a listening position, and the array (10) of microphones (M) is used to determine the resulting three-dimensional sound field above the surface element ($\Delta S$), and using NAH the resulting sound pressure at the surface element ($\Delta S$) is determined. The acoustic transfer function (H) between the surface element ($\Delta S$) and the listening position is assumed to be reciprocal and is determined as the ratio of the resulting sound pressure at the surface element ($\Delta S$) to the volume velocity ($Q_v$). The sound pressure in the listening position resulting from the surface element ($\Delta S$) is determined as $\Delta p = H \cdot (u_n \cdot \Delta S)$.

11 Claims, 2 Drawing Sheets

METHOD OF DETERMINING THE SOUND PRESSURE RESULTING FROM A SURFACE ELEMENT OF A SOUND EMITTING DEVICE

FIELD OF THE INVENTION

The invention relates to the detection and identification of sound sources, and noise sources in particular, with the purpose of reducing noise emission.

BACKGROUND OF THE INVENTION

Protection of the environment and human beings has become increasingly important. Buildings, vehicles such as cars, buses and aircraft, household appliances and industrial machinery have noise producing components such as engines, motors, gears, transmissions etc. In order to protect individuals from such noise, the noise generating components and the transmission path of the noise to a human being have been investigated with the purpose of reducing the generated noise at the source and of reducing the noise transmitted from the source to human beings.

Testing of acoustic properties of noise generating and noise transmitting media such as mechanical structures and air or other fluids is an important part of the process of noise reduction. In complex structures with several noise sources, such as mentioned above, it can be complicated to identify noise sources and transmission paths and their contributions to the perceived noise.

Mathematical models and computerised methods exist for vibro-acoustic analysis of physical structures. Acoustical tools exist for simulating acoustic properties of portions of a human being, such as Mouth Simulator type 4227, Ear Simulators types 4185 and 4195, Head and Torso Simulators types 4100 and 4128, all from Brüel & Kjær Sound and Vibration Measurement A/S, Denmark. All of these are intended for use in analysing sound at different stages in its "normal" forward transmission from the source to a human being.

EP 0 015 852 discloses a three-dimensional array of microphones for measuring the total or directional acoustic power emitted by a sound source. Such an array is suitable for use with the method of the present invention.

U.S. Pat. No. 2002/0035456 discloses a method for predicting the sound pressure at a point resulting from waves generated by or scattered from a body. The method uses acoustic transfer vectors and the reciprocity principle. A purely numerical reciprocal determination of acoustic transfer vectors is disclosed through simulation of a monopole point source in the listening position, numerical determination of the response at the body surface, and hence elements in the acoustic transfer vector.

The transfer function for sound from a small omnidirectional sound source to a point of measurement is often expressed as the acoustic transfer function H (or acoustic transfer impedance $Z_t$) defined as $H=p/Q$, where Q is the volume velocity emitted from the sound source, and p is the sound pressure at the point of measurement resulting from the volume velocity Q generated by the sound source. In most cases the analysed mechanical and acoustic transmission media are reciprocal, which means that the acoustic transfer function is the same both for forward and reverse transmission. In other words, if the sound source and the measuring microphone are interchanged, whereby the transmission of sound through the media is reversed, and boundary conditions remain unchanged, then the acoustic transfer impedance is unaffected, i.e. the "forward" acoustic transfer impedance and the "reverse" acoustic transfer impedance are identical.

It is known to use this fact when analysing the transmission of sound, whereby a sound source is placed in a position that is normally occupied by a human being, i.e. a "listening" position, and a microphone is placed in the normal position of the sound source. This has distinct advantages when identifying sound sources and tracking the noise on its path from the source to the listening position.

When measuring the forward transmission path a Head and Torso Simulator type 4100 from Brüel & Kjær Sound and Vibration Measurement A/S can be placed in the listening position, whereby very realistic measurements of the forward transmission path can be obtained, since the influence of the head and the torso on the transfer function to the ears is taken into account. Danish patent application PA 200300589 discloses a simulator simulating acoustic properties of the head and possibly the torso of a human being. That simulator comprises a sound source for outputting sound signals through the simulated ears. Such a simulator completes the reverse measuring chain and can be placed in a position that is normally occupied by a human being, i.e. a "listening position". By means of a pair of microphones in each simulated ear canal the output sound volume velocity can be measured. This is useful for computing the acoustical transfer function from a sound source to a listening position.

When designing e.g. vehicles such as cars, buses and aircraft the comfort of the passengers, the driver and crewmembers is of importance. Noise can seriously jeopardize not only comfort but also the health of humans. It is therefore important to reduce noise, and for effectively reducing noise it is important to identify noise sources and their individual contribution to the noise level at locations where people are present. Mechanical structures such as body and wall panels can vibrate and emit noise, and large structures can have "hot spots" that emit more noise than "cold spots". Not all hot spots may be serious contributors to the noise level resulting at a "listening position", and, vice versa, cold spots may contribute more seriously than expected. Such phenomena can e.g. be due to conditions in the transmission path from the source to the listening position.

The problem to be solved by the invention is to provide a method of determining, in a predefined position such as a listening position of a human being, the sound pressure resulting from sound emitted from a surface element of a sound emitting surface. In particular there is a need for identifying, among the plurality of noise sources, which can be distributed over a large area, the most significant sources and their contributions to the noise level at one or more listening positions.

SUMMARY OF THE INVENTION

The invention provides such a method for determining the contribution of each surface element of a sound-emitting surface to the noise level at e.g. a listening position.

The sound pressure in the listening position resulting from the sound emitted from a surface element can be calculated by multiplying the emitted volume velocity by the acoustic transfer function (also referred to as the acoustic transfer impedance) from the surface element to the listening position. In general, the acoustic transfer function is defined as the (complex) ratio of the effective sound pressure p at a given point to the volume velocity q of the sound source generating the sound pressure p.

It is assumed that the analysed mechanical and acoustic transmission media are reciprocal, which means that the acoustic transfer function is the same both for forward and reverse transmission. The acoustic transfer function can advantageously be found as the "reverse" acoustic transfer function.

The invention comprises the following two main phases, in which two different measurements are performed to determine the noise source strength and the transfer function, respectively.

I. An "operational measurement" is made with the noise source(s) operating under the conditions to be investigated. A three-dimensional array of microphones is used to measure the three-dimensional sound field above a surface element of a sound emitting surface, and at the surface element the component of the air-particle velocity perpendicular to the surface element is calculated using e.g. Near-Field Acoustical Holography (NAH), the Statistically Optimal NAH (SONAH) as described in [2], or the Inverse BEM (Boundary Element Modelling). The volume velocity emitted by the surface element is then determined by integrating the air-particle velocity over the area of the element—or approximately as the air-particle velocity perpendicular to the surface element multiplied by the area of the surface element. Several surface elements may be covered and measured simultaneously, and the dimensions of each element should be small in comparison to the wavelength.

II. A "transfer function measurement" is made with the noise source(s) under investigation inactivated. This measurement is typically taken with the same array of microphones in the same position as in the operational measurement above, but now the surface element itself must be rigid and non-vibrating. A volume velocity sound source is used to emit a volume velocity in a listening position, and the array of microphones is used to determine the resulting three-dimensional sound field above the surface element. The sound emitted from the volume velocity sound source should preferably be the only sound or at least dominate over possible other sounds. Using e.g. Near-Field Acoustical Holography the resulting sound pressure at the surface element is determined. The acoustic transfer function between the surface element and the listening position is assumed to be reciprocal and is determined as the ratio of the resulting sound pressure at the surface element to the volume velocity emitted by the volume velocity sound source.

The sound pressure in the listening position resulting from sound emitted from the surface element is then determined as the volume velocity emitted by the surface element multiplied by the acoustic transfer function.

For each position of the microphone array 10 all the above steps are repeated, and a noise source "map" can be made of the entire interior surface of e.g. a car cabin, or important parts thereof. Such a map can be used for identifying the most serious noise sources to be attenuated.

The above-described method requires the measurement of the reciprocal transfer function to be performed with the air-particle velocity perpendicular to the surface elements equal to zero, which in turn requires that the surface elements are rigid. According to the above, the only acoustical quantities on the surface element that are taken into account are the "operational" air-particle velocity at the surface and the sound pressure resulting from the volume velocity sound source.

A more general method uses also the "operational" sound pressure and the particle velocity created by the volume velocity sound source, whereby the requirement for rigid surface elements is avoided.

DETAILED DESCRIPTION OF THE INVENTION

The measurement set-up used in the invention is as follows.

Figure 1:
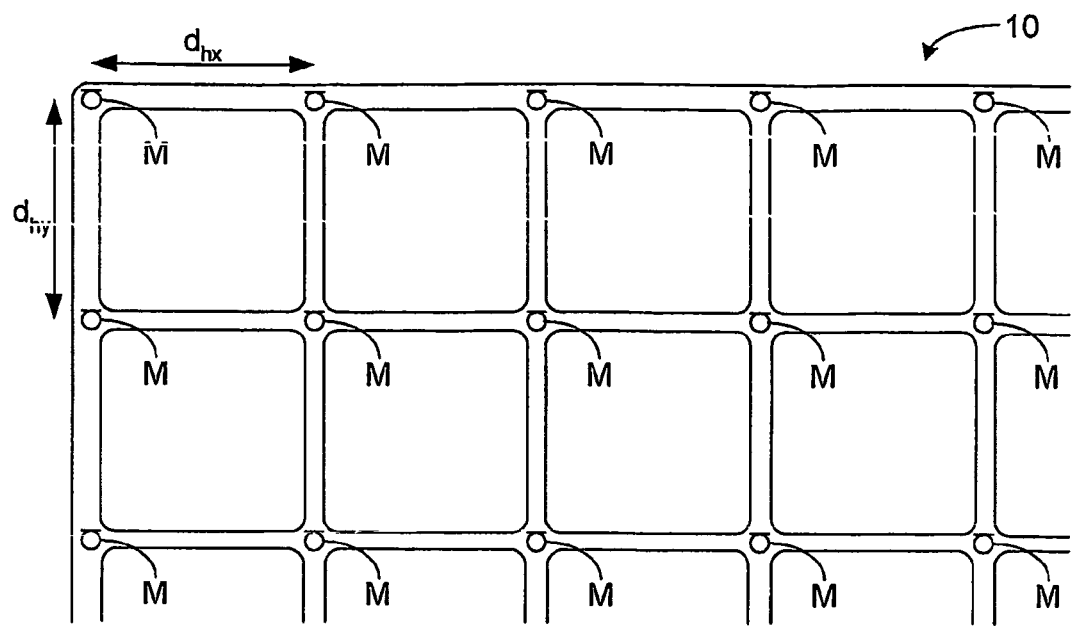
FIG. 1 is a plan view of a portion of a three-dimensional array of microphones used with the invention.
Figure 2:
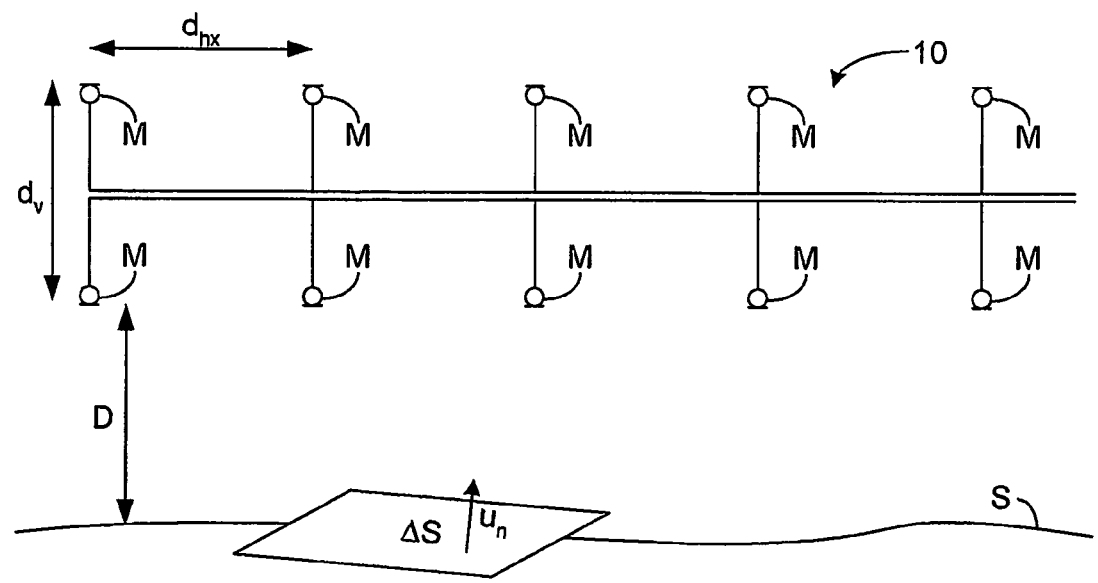
FIG. 2 is a side view of the three-dimensional array of microphones in FIG. 1 shown in a measurement relationship to a sound-emitting surface.

In FIGS. 1 and 2 a three-dimensional array 10 of a plurality of microphones M is shown. The term "microphone" is here used as the generally accepted term for a transducer that generates an (electrical) output signal in response to pressure variations in the fluid (air, water etc.) that surrounds the transducer. The array comprises two identical, parallel layers of microphones M spaced a vertical distance $d_v$ apart. In each layer the microphones are distributed in two sets of parallel rows forming a square grid with the rows spaced horizontal distances $d_{hx}$ and $d_{hy}$, respectively, apart. In the preferred embodiment shown, the vertical distance $d_v$ and the horizontal distances $d_{hx}$ and $d_{hy}$ are identical, whereby the microphones are uniformly distributed and form a cubic lattice. A non-periodic or non-uniform, such as pseudo-random, distribution of the microphones can also be used. The microphones have well-defined, preferably identical, electro-acoustical properties. The array of microphones preferably has a multi-pole plug (not shown) for connecting the microphones to measuring equipment, which is not part of the invention. Each layer of the array can have e.g. 6×6 or 8×8 or any other suitable arrangement of microphones. The vertical and horizontal spacing determine the upper frequency limit at which the array can be used. A vertical and horizontal spacing of 5 cm results in an upper frequency limit of about 3 kHz.

As indicated in FIG. 2, the two layers are separate layers that are assembled and can be disassembled and used independent of each other. The two layers are here planar layers mounted back-to-back, but a fixed three-dimensional array may also be used.

Figure 3:
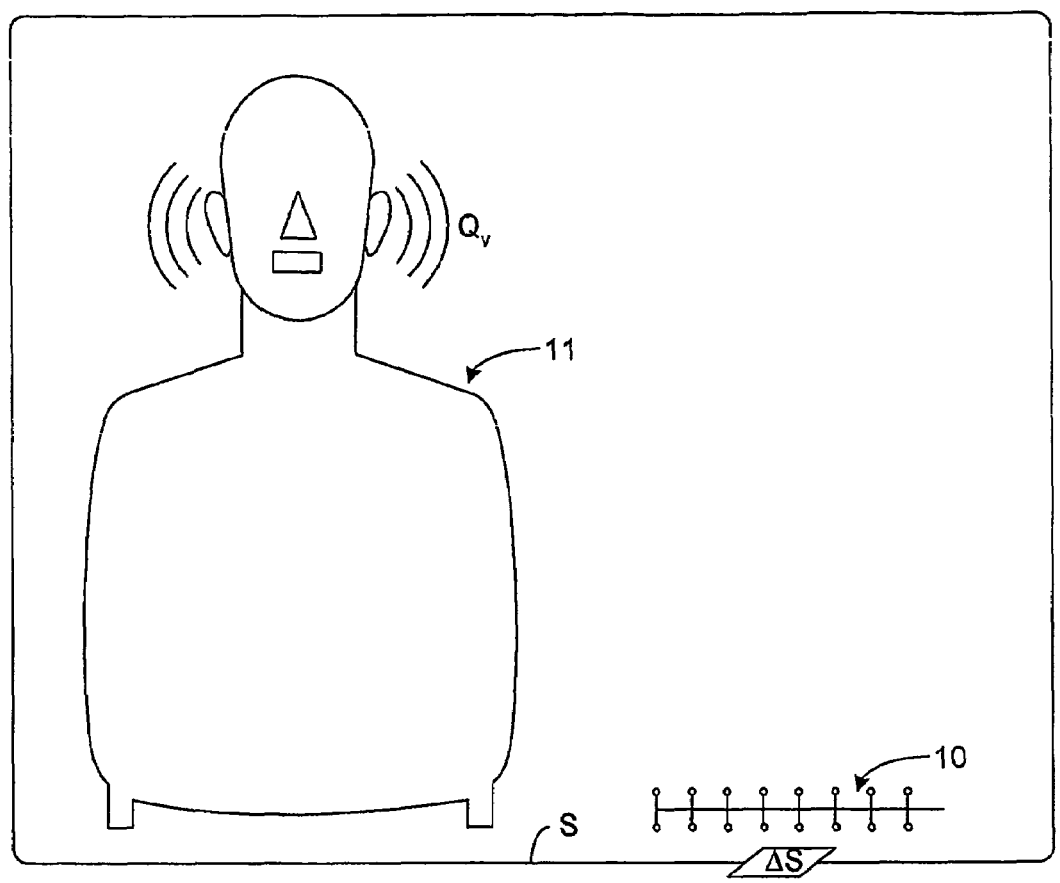
FIG. 3 illustrates a measurement set-up for measuring in e.g. a car cabin.

In FIG. 3 is shown a rectangular frame illustrating e.g. the cabin of a car. The cabin has an interior surface S, which, due to vibrations from the engine, the tyres etc that are transmitted to the cabin, will emit corresponding sound (noise) into the cabin.

In FIGS. 2 and 3 the three-dimensional array 10 of microphones is arranged above the surface S. A surface element $\Delta S$ of the surface S is shown beneath the microphone array 10. The position of the microphone array 10 relative to the surface element $\Delta S$ including the distance D and the lateral coordinates must be well-defined. For regular array geometry, there will typically be one surface element $\Delta S$ for each microphone (in the layer close to the surface), with the microphone at the centre of the corresponding surface element.

With the above set-up the following measurements are taken.

First, an "operational" measurement is taken with the set-up shown in FIGS. 2 and 3. With the "real life" noise sources (engine, tyre noise etc) active, and with the microphone array 10 in the shown position, the sound pressure at each of the microphones M is measured.

Based on the measured three-dimensional distribution of sound pressure over the array of microphones, a calculation is performed of the air-particle velocity $u_n$ perpendicular to the surface element ΔS resulting from the sound emitted from the entire surface S. This can be done using e.g. a well-known Near-Field Acoustical Holography (NAH) method, whereby the three-dimensional acoustical near-field is extrapolated to the surface element ΔS.

Next, a "transfer function measurement" is made. A volume velocity sound source is used to emit a well-defined volume velocity at a predefined position such as a listening position, i.e. a position in which a person occupying a seat in the car would normally have his head or one of his ears. A volume velocity sound source is a sound source that has a speaker in an enclosure with an orifice through which the speaker emits sound with a well-defined volume velocity. The output volume velocity can be measured or calculated by well-known methods, or the volume velocity sound source can be calibrated to emit a volume velocity that is known due to calibration.

The preferred volume velocity sound source 11 is the one disclosed in Danish patent application PA 200300589, which is a simulator simulating acoustic properties of the head and the torso of a human being. The simulator has a sound source for outputting well-defined volume velocity sound signals through the simulated ears for reciprocal measurement of the transfer impedance from a source position to one of the simulated ears.

The noise sources, the engine etc., are switched off, and the volume velocity sound source 11 is used as at least the dominating sound source and preferably the only sound source to avoid possible influence from other sound sources. With the three-dimensional array of microphones still in a predefined position (preferably the same as above) relative to the surface element, the sound pressure at each of the microphones, i.e. the three-dimensional distribution of sound pressure over the array of microphones, is again measured. Using e.g. a Near-Field Acoustical Holography (NAH) method, the three-dimensional distribution of sound pressure over the array of microphones, i.e. the acoustical near-field is extrapolated to calculate the sound pressure on the surface element ΔS resulting from the sound emitted by the volume velocity sound source.

The transfer function is then calculated as the ratio of the calculated sound pressure at the surface element to the volume velocity emitted from the volume velocity sound source. The thus calculated transfer function is both the reverse transfer function and the forward transfer function.

With the volume velocity emitted by the surface element and the transfer function both being known, the resulting sound pressure at the listening position can be found by multiplying the volume velocity by the transfer function.

Depending e.g. on the size of the microphone array 10 and the size of the surface element ΔS, measurement and calculation of the sound pressure resulting from one or more surface elements ΔS can be performed with one position of the microphone array 10. If the contributions from several surface elements are calculated, then these can be added to obtain the contributions from larger areas.

The above-described method requires that the air-particle velocity $u_n$ perpendicular to the surface element ΔS is zero when measuring the transfer function. This requirement is only fully satisfied when the surface S is rigid. In case of a car cabin the interior surfaces often have sound attenuating or sound absorbing materials, which are not rigid, or such materials delimit the useful space of the cabin.

The more general version of the method of the invention to be described below is not limited to rigid surfaces, but the surfaces can be soft such as sound attenuating or absorbing materials. On soft materials the air-particle velocity $u_n$ perpendicular to the surface element ΔS is not necessarily zero when measuring the transfer function, i.e. with sound emitted from a volume velocity sound source. In the more general version of the method of the invention the same measurements as described above are taken, but the processing of the measurements is slightly extended with more calculations.

Like above described, an "operational" measurement is taken with the set-up shown in FIGS. 2 and 3. With the noise sources (engine, tyre noise etc) active, and with the microphone array 10 in the shown position, the sound pressure at each of the microphones M is measured. In addition to the calculation of the air-particle velocity $u_n$ perpendicular to the surface element ΔS resulting from the sound emitted from the surface element, the sound pressure p on the surface element ΔS is also calculated. This, too, can be done using e.g. a well-known Near-Field Acoustical Holography (NAH) method.

Further, also a "transfer function measurement" is made. This is done with the set-up shown in FIG. 3. In addition to the calculation of the sound pressure $p_V$ on the surface element ΔS resulting from the sound emitted by the volume velocity sound source, the air-particle velocity $u_{V,n}$ perpendicular to the surface element ΔS resulting from the sound emitted by the volume velocity sound source is also calculated. This, too, can be done using e.g. a well-known Near-Field Acoustical Holography (NAH) method.

The sound pressure Δp at the listening position is then calculated using the following formula $$\Delta p = \int\int_{\Delta S} \left[\frac{p_V}{Q_V} u_n - \frac{u_{V,n}}{Q_V} p\right] dS \tag{1}$$

where $Q_V$ is the volume velocity emitted by the volume velocity sound source.

For practical purposes, when the variations in sound pressure and particle velocity over the surface element ΔS are small and can be regarded as constant, the surface integral in the above formula (1) can be calculated using the following more simple formula $$\Delta p = \left[\frac{p_V}{Q_V} u_n - \frac{u_{V,n}}{Q_V} p\right] \Delta S \tag{2}$$

The method of the invention is not restricted to closed volumes such as a car cabin, but can also be used for determining the sound pressure resulting from virtually any distributed sound source such as large machinery or a plurality of machines.

The surface element ΔS needs not be the vibrating surface of a mechanical device but can be any imaginary surface in an acoustic medium such as air, or the surface element ΔS may include or be part of a sound-emitting opening in a mechanical device.

Instead of using pressure sensitive microphones as in the above-described embodiment of the invention it is possible to use particle velocity sensors or a combination of pressure sensitive microphones and particle velocity sensors. Particle velocity sensors can be arranged in a three dimensional array like the one illustrated in FIGS. 1 and 2.

In an advantageous alternative each pressure sensitive microphone is combined with a particle velocity sensor, whereby sound pressure and particle velocity are measured substantially in the same point. This allows the thus combined transducers to be arranged in a single layer, which is more compact than the array with two layers in FIGS. 1 and 2.

The invention claimed is:

1. A method of determining, in a predefined target position, a sound pressure ($\Delta p$) resulting from sound emitted from a surface element ($\Delta S$) of a sound emitting surface (S), the method comprising:
   measuring, using a three-dimensional array of a plurality of microphones arranged in a first predefined measuring position relative to the surface element ($\Delta S$), a first three-dimensional distribution of sound pressure;
   calculating, based on the first three-dimensional distribution of sound pressure, an air-particle velocity ($u_n$) on the surface element ($\Delta S$) and perpendicular to the surface element ($\Delta S$), resulting from the sound emitted from the surface (S);
   arranging a sound source capable of emitting a volume velocity ($Q_v$) in the target position;
   causing the sound source to emit the volume velocity ($Q_v$);
   measuring, using a three-dimensional array of a plurality of microphones arranged in a second predefined measuring position relative to the surface element ($\Delta S$) and with the volume velocity ($Q_v$) emitted from the sound source in the target position creating a dominating sound, a second three-dimensional distribution of sound pressure;
   calculating, based on the second three-dimensional distribution of sound pressure, a sound pressure ($p_V$) at the surface element ($\Delta S$) resulting from the volume velocity ($Q_v$) emitted from the sound source in the target position;
   determining a transfer function $H = p_v/Q_v$ as the ratio of the sound pressure ($p_v$) at the surface element ($\Delta S$) to the volume velocity ($Q_v$) emitted from the sound source in the target position; and
   determining the sound pressure ($\Delta p$) in the target position as $\Delta p = H \cdot (u_n \cdot \Delta S)$.

2. A method of determining, in a predefined target position, a sound pressure ($\Delta p$) resulting from sound emitted from a surface element ($\Delta S$) of a sound emitting surface (S), the method comprising:
   measuring, using a three-dimensional array of a plurality of microphones arranged in a first predefined measuring position relative to the surface element ($\Delta S$), a first three-dimensional distribution of sound pressure;
   calculating, based on the first three-dimensional distribution of sound pressure, an air-particle velocity ($u_n$) perpendicular to the surface element ($\Delta S$) and on the surface element ($\Delta S$), and a sound pressure (p) on the surface element ($\Delta S$), resulting from the sound emitted from the surface (S);
   arranging a sound source capable of emitting a volume velocity ($Q_v$) in the target position;
   causing the sound source to emit the volume velocity ($Q_v$);
   measuring, using a three-dimensional array of a plurality of microphones arranged in a second predefined measuring position relative to the surface element ($\Delta S$) and with the volume velocity ($Q_v$) emitted from the sound source in the target position creating a dominating sound, a second three-dimensional distribution of sound pressure;
   calculating, based on the second three-dimensional distribution of sound pressure, a sound pressure ($p_V$) at the surface element ($\Delta S$) and the component of a particle velocity ($u_{V,n}$) perpendicular to the surface element ($\Delta S$) resulting from the volume velocity ($Q_v$) emitted from the sound source in the target position; and
   determining the sound pressure ($\Delta p$) in the target position in accordance with the formula $$\Delta p = \int\int_{\Delta S} \left[ \frac{p_V}{Q_V} u_n - \frac{u_{V,n}}{Q_V} p \right] dS.$$

3. A method according to claim 1, the target position is a listening position suitable for being occupied by a human being.

4. A method according to claim 1, the air-particle velocity ($u_n$) perpendicular to the surface element ($\Delta S$) resulting from the sound emitted from the surface (S) is calculated, based on the first three-dimensional distribution of sound pressure, using a Near-Field Acoustical Holography (NAH) method; and that
   the sound pressure ($p_V$) at the surface element ($\Delta S$) resulting from the volume velocity ($Q_v$) emitted from the sound source in the target position is calculated, based on the second three-dimensional distribution of sound pressure, using a Near-Field Acoustical Holography (NAH) method.

5. A method according to claim 2, the air-particle velocity ($u_n$) perpendicular to the surface element ($\Delta S$) and the sound pressure (p) resulting from the sound emitted from the surface (S) are calculated, based on the first three-dimensional distribution of sound pressure, using a Near-Field Acoustical Holography (NAH) method, and that
   the sound pressure ($p_V$) at the surface element ($\Delta S$) and the air-particle velocity ($u_{V,n}$) perpendicular to the surface element $\Delta S$ resulting from the volume velocity ($Q_v$) emitted from the sound source in the target position are calculated, based on the second three-dimensional distribution of sound pressure, using a Near-Field Acoustical Holography (NAH) method.

6. A method according to claim 1, wherein by using, as the volume velocity sound source, a simulator simulating acoustic properties of at least a head of a human being, the simulator having a simulated ear with an orifice and a sound source for outputting sound signals through the orifice of the simulated ear.

7. A method according to claim 6, the simulator simulates the acoustic properties of the head and a torso of a human being.

8. A method according to claim 1, wherein by using, as the three-dimensional array of a plurality of microphones, an array having two parallel layers of microphones, where each layer comprises a plurality of microphones arranged in a two-dimensional grid.

9. A method according to claim 1, by using, as the three-dimensional array of a plurality of microphones, an array comprising a combination of pressure microphones and particle velocity sensors.

10. A method according to claim 9, by using, as the three-dimensional array of a plurality of microphones and velocity sensors, a planar array of combination sensors, each being able to measure both the sound pressure and the particle velocity component perpendicular to the array plane.

11. A method according to claim 2, the sound pressure ($\Delta p$) in the target position is determined as an approximation in accordance with the formula $$\Delta p = \left[ \frac{p_V}{Q_V} u_n - \frac{u_{V,n}}{Q_V} p \right] \Delta S.$$

* * * * *

UNITED STATES PATENT AND TRADEMARK OFFICE
CERTIFICATE OF CORRECTION

PATENT NO. : 7,316,162 B2  Page 1 of 1
APPLICATION NO. : 10/576559
DATED : January 8, 2008
INVENTOR(S) : Jorgen Hald It is certified that error appears in the above-identified patent and that said Letters Patent is hereby corrected as shown below:

On the Title Page, item (87)
PCT Pub. No., replace "WO2005/043376" and PCT Pub. Date, "May 19, 2006" with --WO2005/045376-- and --May 19, 2005--, respectively.

Signed and Sealed this

Tenth Day of June, 2008

JON W. DUDAS
*Director of the United States Patent and Trademark Office*